United States Patent [19]
Kee Dong

[11] Patent Number: 5,195,696
[45] Date of Patent: Mar. 23, 1993

[54] VIDEO TAPE REEL SUPPORT SPRING

[75] Inventor: Lee Kee Dong, Seoul, Rep. of Korea

[73] Assignee: SKC Limited, Swon, Rep. of Korea

[21] Appl. No.: 298,571

[22] Filed: Jan. 18, 1989

[30] Foreign Application Priority Data

Jan. 25, 1988 [KR] Rep. of Korea .................. 88-576

[51] Int. Cl.$^5$ ............................................. G11B 23/04
[52] U.S. Cl. .................................................. 242/199
[58] Field of Search .............................. 242/197–199; 360/132, 130.3–130.33

[56] References Cited

U.S. PATENT DOCUMENTS 4,685,638  8/1987  Satoyoshi et al. ................... 242/199
4,770,367  9/1988  Carroll ................................ 242/199
4,780,782 10/1988  Bordignon .................... 360/130.3 X
4,802,044  1/1989  Iwahashi et al. ............... 242/199 X

*Primary Examiner*—David Werner
*Attorney, Agent, or Firm*—Lackenbach Siegel Marzullo & Aronson

[57] ABSTRACT

In a video tape reel support spring, the present invention is an improvement on the support spring and is designed for both cost reduction and functional improvement. Its main feature is that a spring of equal width is provided, but a reinforcing means which can prevent its elasticity from weakening is provided and it is altered so as to enable its end to apply just the right pressure to the center boss.

3 Claims, 2 Drawing Sheets

FIG.3.
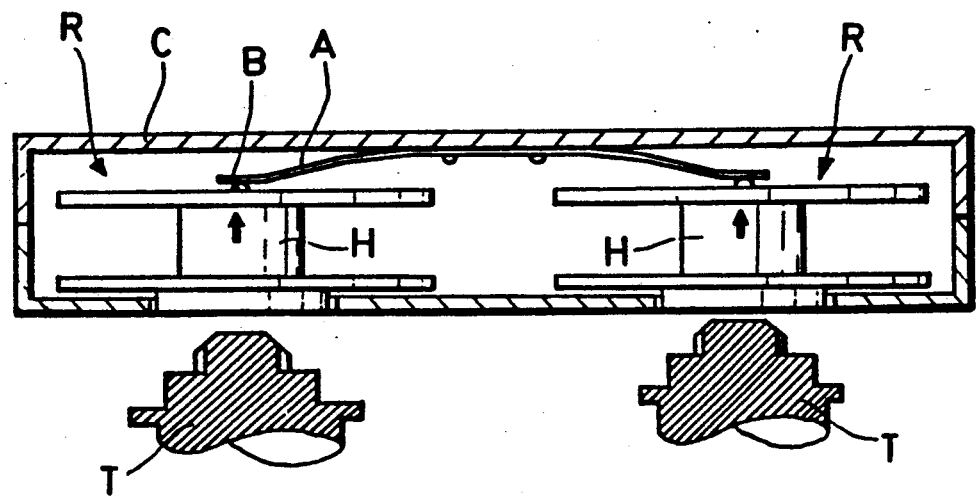
FIG.4.
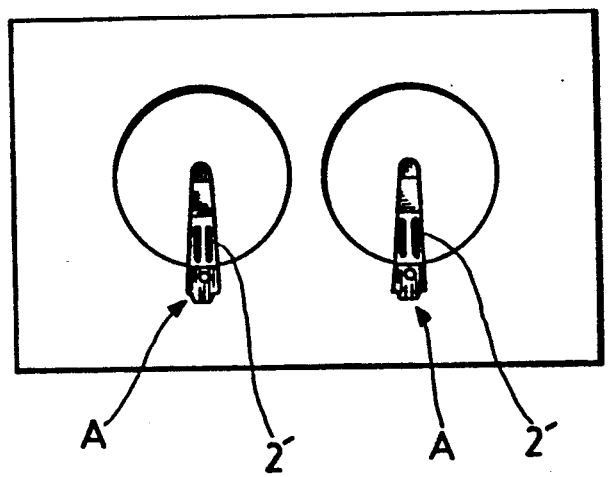
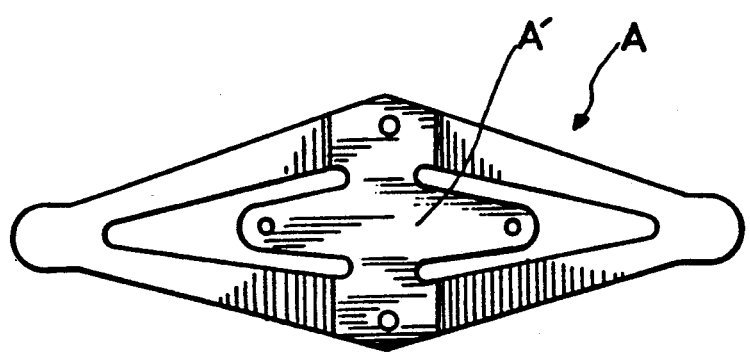
FIG.5.
PRIOR ART

VIDEO TAPE REEL SUPPORT SPRING

The present invention relates to a video tape reel support spring and in particular a support spring which is very elastic and small in size, and one which supports two reels (R) in the inside of the upper cover (C) of the video tape.

In operation, the center boss (B) which is the central point of reel (R) is pressed in and comes into point contact with the end of spring (A), and it gives or flexes when used, in a way that the hub (H) of the reel (R) is stabilized upon insertion into the table (T) of the reel, thereby delivering just enough elastic force with little frictional resistance.

A plate spring as shown in FIG. 5 is used in the prior art, and it involved the following problem.

As seen from a comparison between the figures shown center boss (B) of the reel (R) is provided at the end of the spring (A). So, in order to strengthen the elastic force, a diamond shape is employed, which widely occupies the sticking point (A') in the center and is narrowed down gradually. Consequently, the material which is applicable to the wide portion is unnecessary and it generated an unbalanced pressure leaning toward the center boss (B) which is vertically mounted and caused a gentle flexure.

Taking note of the above fact, the present invention is an improvement on the support spring and is designed both for cost reduction and functional improvement. Its main feature is that a spring of equal width is provided, but a reinforcing means which can prevent its elasticity from weakening is provided and it is altered so as to enable its end to apply just the right pressure to the center boss (B).

A detailed explanation of the present invention with reference to the drawings attached hereto is as follows:

FIG. 3 is a cross sectional view showing that the present invention with the reels in place in the tape reel;

FIG. 4 is another embodiment of the present invention; and

FIG. 5 is a plan view of the prior art.

Figure 1:
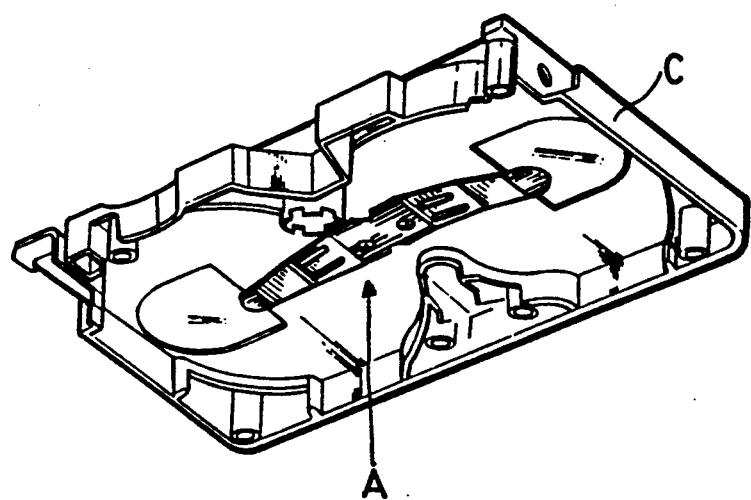
FIG. 1 is a perspective view of the present invention showing the support spring in a tape reel.
Figure 2:
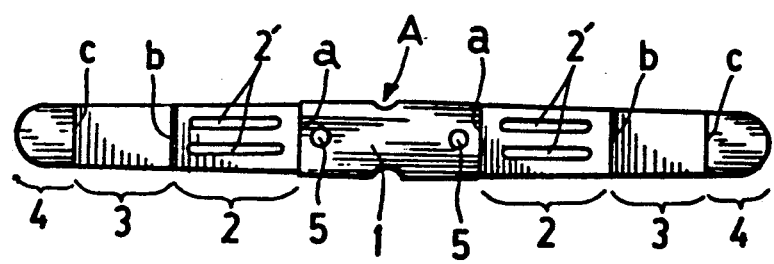
FIG. 2 is a top plan view of the support spring.

As shown in FIGS. 1 to 3, extended parts of almost equal width are formed on both sides with the joining portion (1) corresponding to the center of the spring (A). A support part (2) is provided with an uneven side (2') disposed longitudinally, and an inclined elastic part (3) and an end part (4) are formed in consecutive order and each of these parts forms a staged altitude with division lines (a) (b) (c). Reference numerals (5) indicates openings for joining the spring (A) to the upper cover (C).

The spring (A) is attached by inserting projections rising from the upper cover (c) into the openings (5) formed on the joining side (1) in the center of the spring (A) and then welding the part thereto. Such an attaching method is the same as in the past.

When the spring (A) is installed in such a manner, the center boss (B) comes into contact with the end part (4) when the reel (R) is assembled, and these equal pressure is applied to it because it is bent almost horizontally from the division line (C), with the spring force generally provided by the inclined elastic part (3).

If the spring force is evenly applied to the entire extended part, it tends to weaken. Thus it is made so as to be concentrated on the inclined side. In the support part (2) which connects it thereto, at least more than one uneven side (2') is formed lengthwise so as to maintain a stronger supporting force.

As the support part extends its support starting point so that the inclined elastic part may be strengthened to a considerable degree, it results in having the effect of a greatly reduced width for the spring as compared with those of prior art.

Thus, the elastic force of the present invention increases by means of the support part which is provided with an uneven side and the effect of reducing its width is thereby achieved. At the same time, it has a particular advantage in the case of small tapes (8 mm) which must be smaller and narrower, as shown in the embodiment of FIG. 4.

Thus, the present invention is useful in that it reduces the material for the spring and the production cost of the video tape by providing just the right spring force and pressure with the use of the support spring, thereby improving product reliability.

What is claimed is:

1. An improved resilient reel support spring for a video tape cassette, comprising: a central base portion with opposing ends having extending portions on the opposite ends of the central base portion which are of similar construction, each said extending portion further comprising a support portion having at least one depression embossed longitudinally of said support portion, and each said extending portion further including an elastic portion and adjacent end portion; and the various sections of said extending portion being staged with separate division lines separating the elastic portion from the end portion and the support portion.

2. The improved resilient reel support spring of claim 1 wherein each of said end portion is substantially parallel to the central base portion as compared to the remaining portions of said reel support spring.

3. The improved resilient reel support spring of claim 1, further comprising small opposing notches in the middle portion of said central base portion, whereby with said central base portion cut in half, two identical reel support springs are formed for use in small 8 mm tape devices.

* * * * *